United States Patent
Yi et al.

(10) Patent No.: US 10,159,062 B2
(45) Date of Patent: Dec. 18, 2018

(54) METHOD AND APPARATUS FOR INDICATING USER EQUIPMENT CAPABILITY IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 15/312,517

(22) PCT Filed: May 19, 2015

(86) PCT No.: PCT/KR2015/005023
§ 371 (c)(1),
(2) Date: Nov. 18, 2016

(87) PCT Pub. No.: WO2015/178671
PCT Pub. Date: Nov. 26, 2015

(65) Prior Publication Data
US 2017/0086183 A1   Mar. 23, 2017

Related U.S. Application Data

(60) Provisional application No. 62/058,675, filed on Oct. 2, 2014, provisional application No. 62/053,211, filed (Continued)

(51) Int. Cl.
*H04W 72/04* (2009.01)
*H04W 8/22* (2009.01)
(Continued)

(52) U.S. Cl.
CPC ...... *H04W 72/0406* (2013.01); *H04B 7/0413* (2013.01); *H04L 5/0053* (2013.01);
(Continued)

(58) Field of Classification Search
CPC . H04B 7/0413; H04L 27/2601; H04L 5/0053; H04W 72/0406; H04W 88/02; H04W 88/08; H04W 8/22
See application file for complete search history.

(56) References Cited

U.S. PATENT DOCUMENTS

2012/0307751 A1* 12/2012 Dinan ............... H04L 5/0007
370/329
2013/0188612 A1* 7/2013 Dinan ............... H04W 56/0005
370/336
(Continued)

OTHER PUBLICATIONS

3GPP TSG RAN WG2 Meeting #85bis—R2-141356—Valencia, Spain, Mar. 31-Apr. 4, 2014—"Discussion on new UE category for 600 Mbps"—Huawei, HiSilicon (Year: 2014).*
(Continued)

*Primary Examiner* — Dung B Huynh
(74) *Attorney, Agent, or Firm* — Birch, Stewart, Kolasch & Birch, LLP

(57) ABSTRACT

A method and apparatus for configuring user equipment (UE) capability in a wireless communication system is provided. An evolved NodeB (eNB) configures a first UE for a first release of 3rd generation partnership project (3GPP) long-term evolution (LTE), which does not support 256 quadrature amplitude modulation (QAM), with a first category, and configures a second UE for a second release of 3GPP LTE, which supports 256QAM, with a second category.

6 Claims, 4 Drawing Sheets

Related U.S. Application Data on Sep. 21, 2014, provisional application No. 62/000,488, filed on May 19, 2014.

(51) Int. Cl.

| | |
|---|---|
| *H04B 7/0413* | (2017.01) |
| *H04L 5/00* | (2006.01) |
| H04L 27/26 | (2006.01) |
| H04W 88/02 | (2009.01) |
| H04W 88/08 | (2009.01) |

(52) U.S. Cl.
CPC .......... *H04W 8/22* (2013.01); *H04L 27/2601* (2013.01); *H04W 88/02* (2013.01); *H04W 88/08* (2013.01)

(56) References Cited

U.S. PATENT DOCUMENTS

| | | | | |
|---|---|---|---|---|
| 2014/0192732 | A1* | 7/2014 | Chen ................ | H04L 1/0003 370/329 |
| 2014/0313985 | A1* | 10/2014 | Nimbalker .......... | H04L 27/0012 370/329 |
| 2015/0036590 | A1* | 2/2015 | Lahetkangas ........ | H04L 1/0003 370/328 |
| 2015/0195818 | A1* | 7/2015 | Davydov ............ | H04L 27/3494 370/329 |
| 2015/0195819 | A1* | 7/2015 | Kwon ................ | H04W 72/042 370/329 |
| 2015/0215913 | A1* | 7/2015 | Cheng ................ | H04L 1/0001 370/330 |
| 2015/0256287 | A1* | 9/2015 | Davydov ............. | H04B 7/028 370/329 |
| 2015/0296503 | A1* | 10/2015 | Larsson ............. | H04W 72/048 370/329 |
| 2016/0270055 | A1* | 9/2016 | Larsson ............. | H04L 1/0003 |
| 2016/0338024 | A1* | 11/2016 | Xia ................. | H04L 1/0003 |

OTHER PUBLICATIONS

3GPP, "3rd Generation Partnership Project; Technical Specification Group Radio Access Network; Evolved Universal Terrestrial Radio Access (E-UTRA); User Equipment (UE) Radio Access Capabilities (Release 12)," 3GPP TS 36.306, V12.0.0, Mar. 2014 (Mar. 20, 2014), pp. 1-29, XP50769966.

Blackberry UK Limited, "On UE Category/Capability Handling to Support 256 QAM," 3GPP TSG RAN WG1 Meeting #77, R1-142354, Seoul, Korea, May 19-23, 2014 (EPO Server date May 18, 2014), pp. 1-6, XP50789471.

Broadcom Corporation, "Discussions on UE Category with Introduction of 256 QAM," 3GPP TSG-RAN WG1 Meeting #77, R1-142275, Seoul, South Korea, May 19-23, 2014 (EPO Server date May 18, 2014), 3 pages, XP50789392.

CMCC, "Discussion on UE category for 256QAM," TSG-RAN WG1 #76, Prague, Czech Republic, R1-140592, Feb. 10-14, 2014 (EPO Server date Feb. 9, 2014), 4 pages, XP50736118.

Huawei et al., "Discussion on UE Category with Introduction of 256QAM," 3GPP TSG RAN WG1 Meeting #76, R1-140036, Prague, Czech Republic, Feb. 10-14, 2014 (EPO Server date Feb. 9, 2014), 3 pages, XP50735603.

Huawei et al., "Discussion on UE Category with Introduction of 256QAM," 3GPP TSG RAN WG1 Meeting #77, R1-141933, Seoul, Korea, May 19-23, 2014 (EPO Server date May 18, 2014), 4 pages, XP50789053.

Qualcomm Incorporated, "UE Category Handling for 256QAM," 3GPP TSG-RAN WG1 #77, R1-141955, Seoul, Korea, May 19-23, 2014 (EPO Server date May 18, 2014), 4 pages, XP50789075.

BlackBerry UK Limited, "New UE Category to Support 256 QAM", R1-141579, 3GPP TSG RAN WG1 Meeting #76bis, Shenzhen, China, Mar. 31-Apr. 4, 2014. (URL: http://www.3gpp.org/ftp/tsg_ran/WG1_RL1/TSGR1_76b/Docs/), See pp. 1-5. and figures 1-3.

CMCC, "Considerations on UE category supporting 256QAM", R1-141612, 3GPP TSG-RAN WG1 #76bis, Shenzhen, China, Mar. 31-Apr. 4, 2014, (URL: http://www.3gpp.org/ftp/tsg_ran/WG1_RL1/TSGR1_76b/Docs/), See pp. 1-3.

Ericsson, "On 256QAM UE category handling", R1-141638, 3GPP TSG RAN WG1 Meeting #76bis, Shenzhen, China, Mar. 31-Apr. 4, 2014, (URL: http://www.3gpp.org/ftp/tsg_ran/WG1_RL1/TSGR1_76b/Docs/), See pp. 1-4.

Huawei et al., "Discussion on UE category with introduction of 256QAM", R1-141122, 3GPP TSG RAN WG1 Meeting #76bis, Shenzhen, China, Mar. 31-Apr. 4, 2014, (URL: http://www.3ppp.org/ftp/tsg_ran/WG1_RL1/TSGR1_76b/Docs/), See pp. 1-5, and tables 1, 2.

Motorola Mobility, "UE category in support of 256-QAM", R1-141608, 3GPP TSG RAN WG1 #76bis, Shenzhen, China, Mar. 31-Apr. 4, 2014, (URL: http://www.3gpp.org/ftp/tsg_ran/WG1_RL1/TSGR1_76b/Docs/), See pp. 1-2.

* cited by examiner

[Fig. 1]
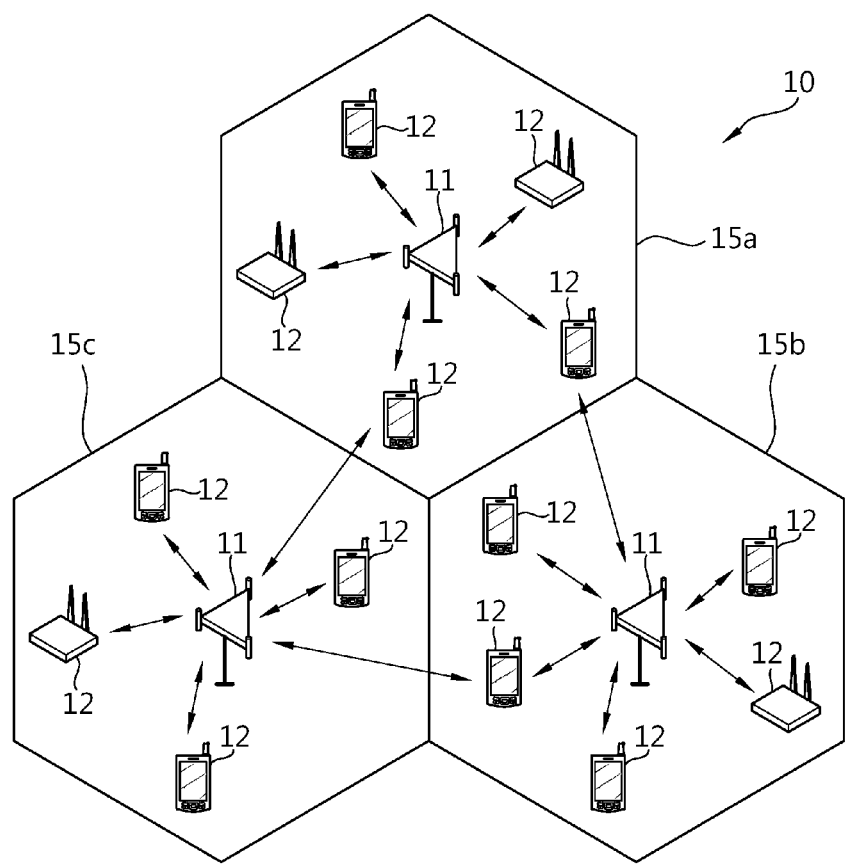
[Fig. 2]
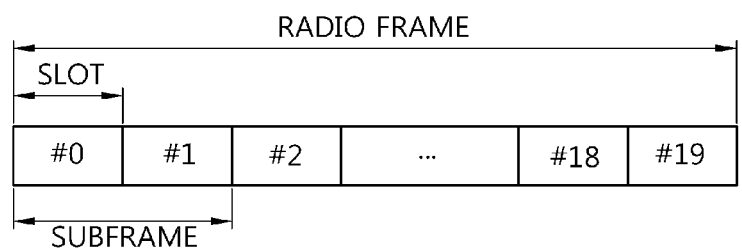

[Fig. 3]
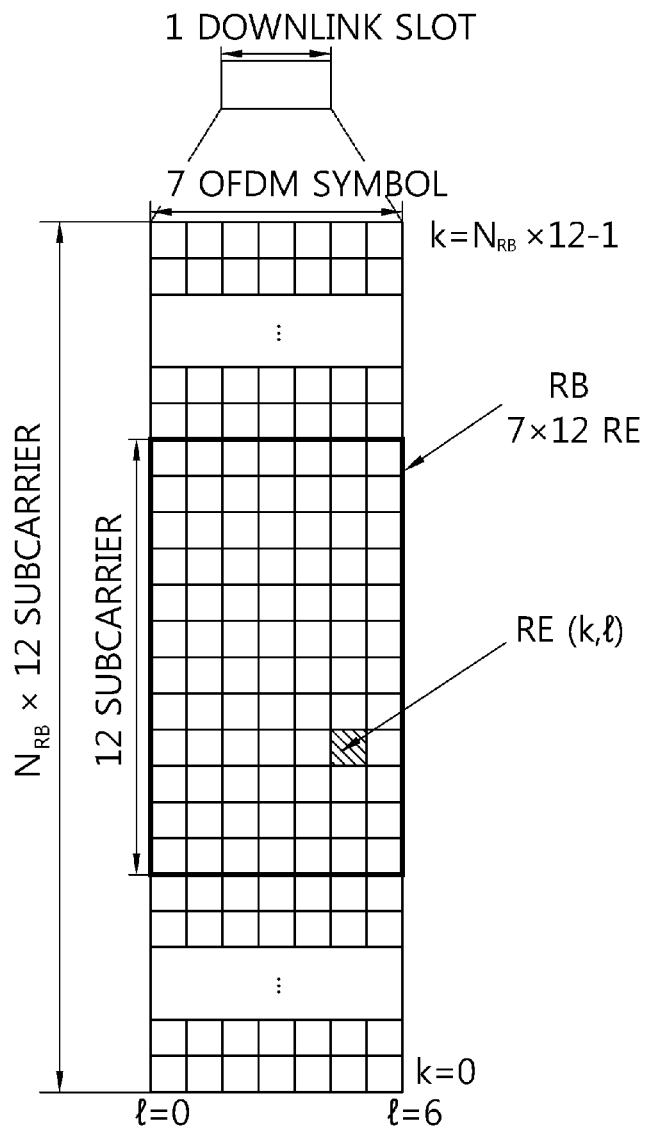

[Fig. 4]
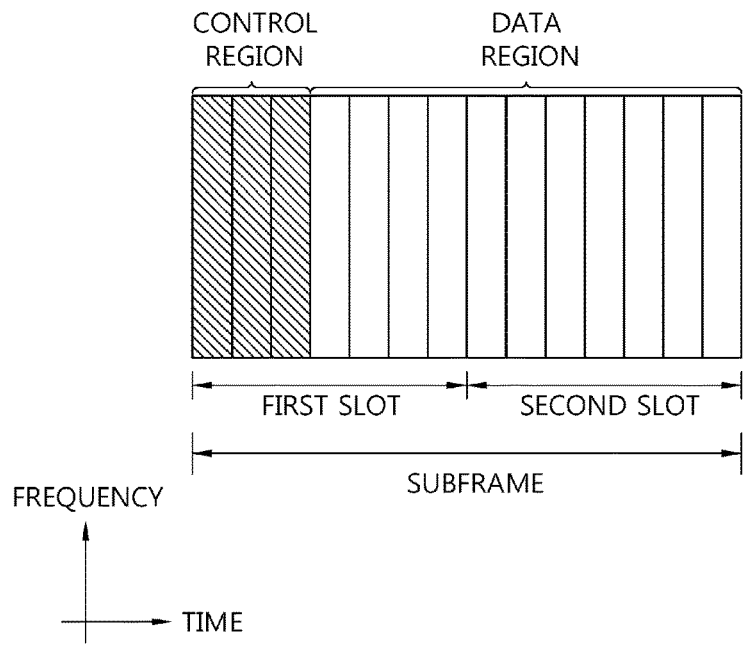
[Fig. 5]
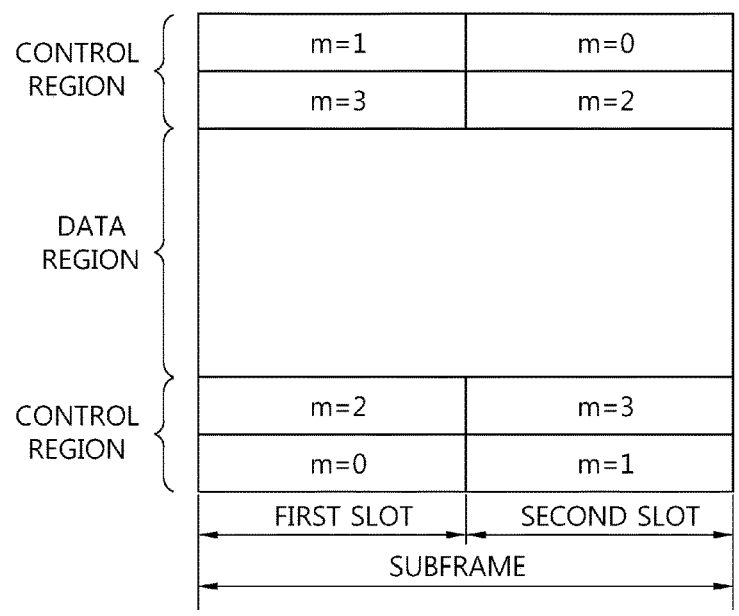

[Fig. 6]
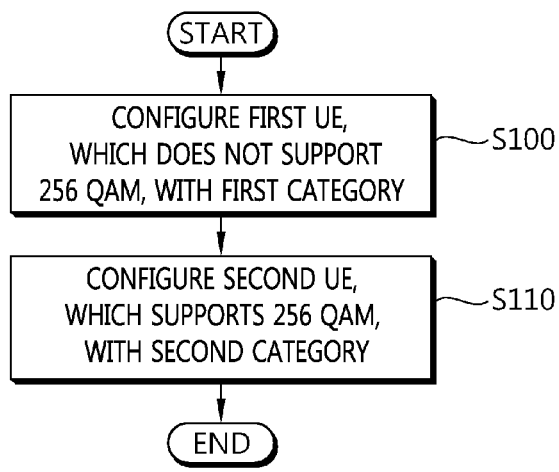
[Fig. 7]
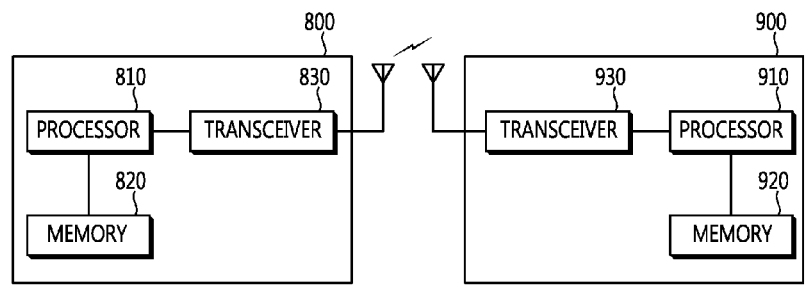

METHOD AND APPARATUS FOR INDICATING USER EQUIPMENT CAPABILITY IN WIRELESS COMMUNICATION SYSTEM

CROSS REFERENCE TO RELATED APPLICATIONS

This application is the National Phase of PCT International Application No. PCT/KR2015/005023, filed on. May 19, 2015, which claims priority under 35 U.S.C. 119(e) to U.S. Provisional Application No. 62/000,488, filed on May 19, 2014, 62/053,211 filed on Sep. 21, 2014 and 62/058,675 filed on Oct. 2, 2014, all of which are hereby expressly incorporated by reference into the present application.

TECHNICAL FIELD

The present invention relates to wireless communications, and more particularly, to a method and apparatus for indicating a user equipment (UE) capability in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Generally, each radio access technology has defined specific classes of terminals in terms of radio capabilities. Generally, the aim to mandate certain essential functions/requirements can help to simplify the system definition as well as the realization options (e.g. mandating 20 MHz of downlink (DL) reception as well as 20 MHz uplink (UL) transmission bandwidth significantly reduced the 3GPP LTE system complexity). Especially, mandating certain terminal functions may be useful for the system design if a defined subset of parameter combinations are also supported by the systems, e.g. the eNB scheduler. However, there is also a risk that not all the defined features are deployed in the networks at the time when terminals are made commercially available on the market place. Some features are likely to be rather large and complex, which further increases the risk of interoperability problems unless these features have undergone sufficient interoperability testing (TOT) on real network equipment, and preferably with more than one network in order to improve the confidence of the UE implementation. Thus, avoiding unnecessary UE mandatory features but instead defining a limited set of UE radio classes allows simplification for the interoperability testing.

Given the discussion above, it seems beneficial for the introduction of 3GPP LTE to limit the combination of radio capabilities to a clearly defined subset and ensure that a given set of parameters is supported by certain UE classes as well as networks for rapid 3GPP LTE deployment. It seems unrealistic to mandate only one single UE class which always mandates the maximum capability.

The aim is to ensure on the one hand that high end 3GPP UEs, supporting data rates representing state of the art level and competitive with other radio technologies are defined, while the medium and lower data rates aim to reduce implementation cost for chipset/terminal vendors and allow adoption of most cost efficient solutions for different market segments. It is expected that the support of the high end data rate terminals is ensured from the very beginning.

In 3GPP LTE, introduction of high order modulation, like 256 quadrature amplitude modulation (QAM), may be considered as a part of improvement of spectral efficiency. In this case, a method for configuring UE capabilities supporting higher modulation order may be required.

DISCLOSURE OF INVENTION

Technical Problem

The present invention provides a method and apparatus for indicating user equipment (UE) capability in a wireless communication system. The present invention provides UE capability signaling mechanism to indicate support of higher modulation order or higher layer or higher bandwidth.

Solution to Problem

In an aspect, a method for configuring, by an evolved NodeB (eNB), user equipment (UE) capability in a wireless communication system is provided. The method includes configuring a first UE for a first release of 3rd generation partnership project (3GPP) long-term evolution (LTE), which does not support 256 quadrature amplitude modulation (QAM), with a first category, and configuring a second UE for a second release of 3GPP LTE, which supports 256QAM, with a second category.

In another aspect, an evolved NodeB (eNB) includes a memory, a transceiver, and a processor coupled to the memory and the transceiver, and configured to configure a first UE for a first release of 3rd generation partnership project (3GPP) long-term evolution (LTE), which does not support 256 quadrature amplitude modulation (QAM), with a first category, and configure a second UE for a second release of 3GPP LTE, which supports 256QAM, with a second category.

Advantageous Effects of Invention

UE capability supporting higher modulation order can be configured efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a method for configuring UE capability according to an embodiment of the present invention.
FIG. 7 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PD-CCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

UE capabilities and/or UE categories are described. It may be referred to as Section 4 of 3GPP TS 36.306 V12.0.0 (2014-03). The UE category may be determined by three major capabilities, which are maximum data rate within a TTI, maximum transport block (TB) size per TB, and soft buffer size. Besides those three major capabilities, the UE needs to signal other capabilities such as MIMO support, band-combination support, etc. Based on those capabilities, the network may determine the maximum data rate, number of layers, number of carriers, etc.

The field ue-Category defines a combined UL and DL capability. Table 1 describe below define the DL physical layer parameter values for each UE category. Table 2 describe below define the UL physical layer parameter values for each UE category. A UE indicating category 6 or 7, which are Rel-10 category, shall also indicate category 4, which is Rel-8 category. A UE indicating category 8, which is Rel-10 category, shall also indicate category 5, which is Rel-8 category. A UE indicating category 9, which is Rel-11 category, shall also indicate category 6 and 4, which are Rel-10 and Rel-10 category, respectively. A UE indicating category 10, which is Rel-11 category, shall also indicate category 7 and 4, which are Rel-10 and Rel-10 category, respectively.

TABLE 1

| UE Category | Maximum number of DL-SCH transport block bits received within a TTI | Maximum number of bits of a DL-SCH transport block received within a TTI | Total number of soft channel bits | Maximum number of supported layers for spatial multi-plexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers)75376 (2 layers) | 3654144 | 2 or 4 |
| Category 7 | 301504 | 149776 (4 layers)75376 (2 layers) | 3654144 | 2 or 4 |
| Category 8 | 2998560 | 299856 | 35982720 | 8 |
| Category 9 | 452256 | 149776 (4 layers)75376 (2 layers) | 5481216 | 2 or 4 |
| Category 10 | 452256 | 149776 (4 layers)75376 (2 layers) | 5481216 | 2 or 4 |

TABLE 2

| UE Category | Maximum number of UL-SCH transport block bits transmitted within a TTI | Maximum number of bits of an UL-SCH transport block transmitted within a TTI | Support for 64QAM in UL |
|---|---|---|---|
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |

In Table 1, the maximum number of DL-SCH transport block bits received within a TTI defines the maximum number of DL-SCH transport blocks bits that the UE is capable of receiving within a DL-SCH TTI. The Maximum number of bits of a DL-SCH transport block received within a TTI defines the maximum number of DL-SCH transport block bits that the UE is capable of receiving in a single transport block within a DL-SCH TTI. The total number of DL-SCH soft channel bits defines the total number of soft channel bits available for HARQ processing. The maximum number of supported layers for spatial multiplexing in DL defines the maximum number of supported layers for spatial multiplexing per UE. The UE shall support the number of layers according to its Rel-8/9 category (category 1-5) in all non-carrier aggregation (CA) band combinations.

In Table 2, the maximum number of bits of an UL-SCH transport block transmitted within a TTI defines the maximum number of UL-SCH transport block bits that the UE is capable of transmitting in a single transport block within an UL-SCH TTI. The maximum number of UL-SCH transport block bits transmitted within a TTI defines the maximum number of UL-SCH transport blocks bits that the UE is capable of transmitting within an UL-SCH TTI. The support for 64QAM in UL defines if 64QAM is supported in UL.

As more features, such as higher order modulation (i.e. 256 quadrature amplitude modulation (QAM)) or higher number of layers, are introduced, how to determine UE capability may be a problem. That is, as more capabilities are introduced, whether to define a new UE category or not may become a big issue particularly considering more carriers, more spectral efficiency enhancement techniques.

Hereinafter, a method or indicating UE capability according to an embodiment of the present invention. According to an embodiment of the present invention, currently defined UE category may be used to support higher processing capability, such as higher order modulation, as a unified fashion. Accordingly, the UE capability may be determined by the maximum data rate and/or soft buffer size only.

Table 3 shows an example of UE categories according to an embodiment of the present invention.

TABLE 3

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 (64 QAM 4 layers)195816 (256 QAM 4 layers) | 3667200 | 4 |
| Category 6 | 301504 | 149776 (64 QAM 4 layers)195816 (256 QAM 4 layers) 75376(64 QAM 2 layers) 97896 (256 QAM 2 layers) | 3654144 | 2 or 4 |
| Category 7 | 301504 | 149776 (64 QAM 4 layers)195816 (256 QAM 4 layers) 75376 (64 QAM 2 layers)97896 (256 QAM 2 layers) | 3654144 | 2 or 4 |
| Category 8 | 2998560 | 299856 | 35982720 | 8 |
| Category 9 | 452256 (64 QAM) [587376 (256 QAM)] | 149776 (64 QAM 4 layers)195816 (256 QAM 4 layers) 75376 (64 QAM 2 layers)97896 (256 QAM 2 layers) | 5481216 | 2 or 4 |
| Category 10 | 452256 (64QAM) [587376 (256 QAM)] | 149776 (64 QAM 4 layers)195816 (256 QAM 4 layers) 75376 (64 QAM 2 layers)97896 (256 QAM 2 layers) | 5481216 | 2 or 4 |

TABLE 3-continued

| UE Category | Maximum number of DL-SCH transport block bits received within a TTI (Note) | Maximum number of bits of a DL-SCH transport block received within a TTI | Total number of soft channel bits | Maximum number of supported layers for spatial multi-plexing in DL |
|---|---|---|---|---|
| Category 11 | 3916560 (256 QAM 8 layer) | 391656 (256 QAM 8 layer) | 35982720 | 8 |

For example, a UE of category 4 may report that category 5 can be supported. However, when the UE reports the UE capability, the UE may not report any MIMO related capability. Yet, the UE may report 256QAM capability. In that case, since the UE has not reported MIMO capability, single layer is assumed, and accordingly, the network may match the maximum TB size to the lower UE category, i.e. category 4 in this case. For another example, a UE of category 3 may report category 4 with 256QAM capability in which case the network may assume that the soft buffer size of the UE is less than that of category 4. However, the UE may support 256QAM and thus may exceed the soft buffer size of category 3.

The point is not to introduce a new UE category which is in between two existing UE categories for 256QAM. Rather, the UE may report higher UE category along with other UE capabilities. When the UE reports 256QAM capability, the network may assume that maximum data rate, maximum TB size and soft buffer size may be determined based on lower UE category with 256QAM capability. Another way is to report two UE categories, one of which is higher UE category and the other is baseline UE category. The exact UE capability to support 256QAM may be located between two UE categories.

To determine the exact soft buffer size, the network may assume the soft buffer size of higher UE category, and it may be up to the UE if the scheduling exceeds its current capability.

Another aspect related to a new feature, when a UE reports a new UE category, to handle legacy eNB, it shall report fall-back UE category as well. For example, A UE of category 6 may report category 4 as well. In this case, since the network of new release will support new features, the network may not assume that the same capability can be supported for fallback categories. In this example, if the UE reports 256QAM capability along with category 6, the network may not assume 256QAM capability with category 4.

So far, a new UE category with a new feature specified in a specific release may be defined for that specific release or the future releases beyond that release. For example, when CA is adopted in Rel-10, new UE categories, i.e. category 6-8, supporting more than one component carrier (CCs) are introduced. Likewise, the support of 256QAM has been introduced in Rel-12, and accordingly, new UE categories supporting larger maximum data rate with 256QAM capability may be introduced.

In parallel, as more number of CCs are introduced (and even more number of CCs will be introduced in near future), there are great demands to have UE categories which support more CCs. In this case, similar maximum data rate may be achieved by increasing number of CCs or by adopting 256QAM.

It is possible that previous releases may also define new UE categories which share the same maximum data rate to new UEs supporting 256QAM in the current LTE release (Rel-12) or new UE categories defined in future release with some new features. For example, the network may allow a Rel-11 UE to signal a new UE category supporting 600 Mbps in DL if the Rel-11 UE can make it using 2DL CA+4 layers MIMO or 4DL CA+2layer MIMO. Further, the network may make sure that a Rel-12 UE that supports 600 Mbps in DL due to 256QAM signals this fact to the network due to the related Rel-12 capability. In this case, Rel-12 UE supporting the same maximum data rate may have an issue that it also needs to support the previous release capabilities, which means that previous release capability is mandated for Rel-12 UEs.

As this is not desirable, the following options may be considered.

(1) If the same UE category X for the same maximum data rate is defined in Rel-11 and 12 separately:

For example, for category supporting 600 Mbps in DL, Rel-12 UE of category X may have to support 4 CC for 600 Mbps if it does not support 256QAM and 3CCs for 600 Mbps if it supports 256QAM. Rel-11 UE of category Y may have to support 4CC for 600 Mbps. In this case, Rel-12 UE of category X may not support category Y from Rel-11 eNB perspective. Thus, when signaling the UE category, a Rel-12 UE (if it supports category X as well) needs to explicitly signal category X as well as category Y. If the Rel-12 UE supports category X as well, the Rel-12 UE may signal only category X along with the 256QAM capability. Then Rel-12 eNB may assume that category Y is also supported.

(2) If the same UE category is used in Rel-11 and 12:

1) Option 1: UE category of previous release may be mandated as a prerequisite to support a new feature for the same UE category. For example, for UE category supporting 600 Mbps in DL, it is mandated that 4CC with 2 layers or 2CC with 4 layers for Rel-12 UE of category X which also supports 3CC with 2 layers with 256QAM. In other words, in this case, the may UE support either 4CC with 2 layers or 2CC with 4 layers and 3CC with 2 layers with 256QAM.

2) Option 2: UE of new release may be allowed not to support UE categories of previous release, even though it declares the same UE category. For example, Rel-12 UE of category X may be allowed not to support neither of 4CC with 2 layers nor 2CC with 4 layers. To clarify this, Rel-11 eNB may assume that the UE supporting category X supports the following:

4CC with 2 layers (only if the UE signals four CCs with 2 layers supported, otherwise, this should not be assumed)

3CC with 2 layers (only if the UE signals three CCs)

2CC with 4 layers (only if the UE signals two CCs with 4 layers supported, otherwise, Rel-11 eNB may not assume that the UE of category X can support 2CC with 4 layers)

In other words, Rel-11 eNB may assume that category X may support only the common combinations between Rel-11 category X and Rel-12 category X. In other words, all common combinations of CCs, layers, capabilities may be assumed for previous release eNB as well in case of the new UE category is received. For other combination(s), the network may not assume anything. Thus, when Rel-11 category X is defined, it may be defined that a UE supports either 3CC with 2 layers, 4CC with 2 layers, or 2CC with 4 layers.

More specifically, Rel-11 eNB may not assume that UE of category X will support either 4CC with 2 layers or 2CC with 4 layers, unless the UE signals the CA combinations. It may assume that 3CC with 2 layers are supported instead of 2CC with 4 layers. If the UE signals 4CC combinations, it may assume the UE supports 4CC with 2 layers. Thus, from Rel-11 eNB perspective, a UE of category X may support 2CC with 4 layers or 4CC with 2 layers if it signals the carrier combinations to support either. Otherwise, the Rel-11 eNB may not assume that UE of category X supports this as UE of category X may support 2CC with 2 layers with 256QAM (in this case, from Rel-11 eNB perspective, a UE supports only 2CC with 2 layers). Thus, a network may assume that UE of category X may support one of either 2CC with 2 layers, 3CC with 2 layers, 4CC with 2 layers, or 2CC with 4 layers depending on its signaling.

A UE may support 2CC with 2 layers for only one of band combinations. In other words, a UE is not required to support 2CC for all possible band combinations. For 2 layers, 2 layers may be supported for 2 CC. The same may be applied to 3CC, 4CC and 2CC with 4 layers.

3) Option 3: release-dependent category signaling may be used. For the same UE category X with same/similar maximum data rate, the UE may signal support of category X based on different releases, independently. For example, a Rel-12 UE supporting category X whereas it may not support maximum data rate defined for category X without Rel-12 functionality, the Re-12 UE may signal Rel-12 category X without signaling Rel-11 category X. If the Rel-12 UE supports the same/similar maximum data rate using features from both releases (i.e., support category X maximum data rate using Rel-11 features only and support category X maximum data rate using Rel-12 features as well), the Rel-12 UE may signal both Rel-11 category X and Rel-12 category X.

From Rel-11 eNB perspective, if there is no signal on Rel-11 category X, it may not assume that the UE can support category X capabilities. From Rel-12 eNB perspective, if there is no signal on Rel-12 category X, it may not assume that the UE supports Rel-12 capabilities to support category X capabilities (including maximum data rate). If a UE signals Rel-11 category X, the Rel-12 eNB may assume that the UE supports either 4CC with 2 layers or 2CC with 4 layers using features up to Rel-11. Further, if there is additional Rel-12 category X signaling, and the network can understand the Rel-12 signals, the Rel-12 eNB may assume that the UE additionally supports either 3CC with 256QAM or 4CC with 2 layers without 256QAM capability (i.e. support the maximum data rate of category X using release 12 features).

From a UE signaling perspective, the UE signals the same category per release and may duplicate the signal if it supports both capabilities. In general, this can be applied to other cases as well. For the future UE category, it should be tied with release such that a UE can satisfy a certain set of maximum data rate using the features up to that signaled release. For example, if Rel-12 signal is used, a UE may support a maximum data rate supported by a UE category utilizing features introduced up to Rel-12. For Rel-11 signaling, the UE may support the maximum data rate based on features up to Rel-11. Thus, if a UE supports 600 Mbps with 4CC with 2 layers without 256QAM in Rel-12, the fallback signaling may include Rel-11 category X (600 Mbps with 4CC with 2 layers) and Rel-11 category 9, Rel-10 category 6 and Rel-8 category 4. In other words, the categories may be specified per release and the fallback may include all the supported categories of previous releases.

For example, for category X supporting 600 Mbps, if a UE supports 256QAM with 3CC, but not support 4CC with 2 layers, the UE may signal Rel-12 category X. If a UE supports 2CC with 4 layers or 4CC with 2 layers with Rel-11 features, the UE may also signal Rel-11 category X. Otherwise, the UE may not signal Rel-11 category X. It may also signal previous release fallback categories such as category 9, category 6, and category 4.

Depending on release which is associated with the category, the network may assume different UE capability regarding the number of layers, the number of CC supported, the supportability of 256QAM, soft buffer size, potentially maximum data rate. In case of category X supporting 600 Mbps, the maximum data rate supporting 2CC with 4 layers and 3CC with 256QAM may be different. In that case, the network may assume the maximum data rate differently depending on the signaling of release. In that sense, the maximum data rate of a UE category may be slightly different per release. For example, for category X supporting 600 Mbps, the maximum data rate is 603008 if Rel-11 category X is signaled and the maximum data rate is 587376 if only Rel-12 category X is signaled. Thus, there may be different maximum data rate depending on UE signaling related to release and/or capability.

FIG. 6 shows an example of a method for configuring UE capability according to an embodiment of the present invention. In step S100, the eNB configures a first UE for a first release of 3GPP LTE, which does not support 256QAM, with a first category. In step S110, the UE configures a second UE for a second release of 3GPP LTE, which supports 256QAM, with a second category. The first release may be 3GPP LTE release 11 or before release, and the second release may be 3GPP LTE release 12 or after release. The first UE may supports 600 Mbps in DL by 2 CCs with 4 layers or 4 CCs with 2 layers. The second UE supports 600 Mbps in DL by 3 CCs with 2 layers. The eNB may receive information on the first category from the first UE, and information on the second category from the second UE. The first category and the second category may have the same maximum data rate. Or, the first category and the second category may be the same category. In this case, the second UE may or may not support the first category.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for configuring, by an evolved NodeB (eNB), user equipment (UE) capability in a wireless communication system, the method comprising:
    configuring a first UE for a first release of 3rd generation partnership project (3GPP) long-term evolution (LTE), which does not support 256 quadrature amplitude modulation (QAM), with a first category, X;
    configuring a second UE for a second release of 3GPP LTE, which supports 256QAM, with a second category, Y,
    wherein the first release is 3GPP LTE release 11 or an earlier release, and
    wherein the second release is 3GPP LTE release 12 or a later release;
    determining whether the first category, X, and the second category, Y, are a same category for a same peak data rate in downlink (DL); and
    if it is determined that the first category, X, and the second category, Y, are the same category for the same peak data rate, determining whether the same category is defined in the first release of 3GPP LTE and the second release of 3GPP LTE separately,
    wherein if it is determined that the same category is defined in the first release of 3GPP LTE and the second release of 3GPP LTE separately, the second UE for the second release of 3GPP LTE explicitly signals both the first category, X, and the second category, Y, and
    wherein if it is determined that the second UE for the second release of 3GPP LTE supports the first category, X, the second UE for the second release of 3GPP LTE only signals the first category, X.

2. The method of claim 1, wherein the first UE supports 600 Mbps in the DL by 2 component carriers (CCs) with 4 layers or 4 CCs with 2 layers.

3. The method of claim 1, wherein the second UE supports 600 Mbps in the DL by 3 CCs with 2 layers.

4. An evolved NodeB (eNB) comprising:
    a memory;
    a transceiver; and
    a processor coupled to the memory and the transceiver, and configured to:
        configure a first UE for a first release of 3rd generation partnership project (3GPP) long-term evolution (LTE), which does not support 256 quadrature amplitude modulation (QAM), with a first category, X,
        configure a second UE for a second release of 3GPP LTE, which supports 256QAM, with a second category, Y,
        wherein the first release is 3GPP LTE release 11 or an earlier release, and
        wherein the second release is 3GPP LTE release 12 or a later release,
        determine whether the first category, X, and the second category, Y, are a same category for a same peak data rate in downlink (DL), and
        if it is determined that the first category, X, and the second category, Y, are the same category for the same peak data rate, determine whether the same category is defined in the first release of 3GPP LTE and the second release of 3GPP LTE separately,
        wherein if it is determined that the same category is defined in the first release of 3GPP LTE and the second release of 3GPP LTE separately, the second UE for the second release of 3GPP LTE explicitly signals both the first category, X, and the second category, Y, and
        wherein if it is determined that the second UE for the second release of 3GPP LTE supports the first category, X, the second UE for the second release of 3GPP LTE only signals the first category, X.

5. The eNB of claim 4, wherein the first UE supports 600 Mbps in the DL by 2 component carriers (CCs) with 4 layers or 4 CCs with 2 layers.

6. The eNB of claim 4, wherein the second UE supports 600 Mbps in the DL by 3 CCs with 2 layers.

* * * * *